United States Patent [19]

Weiler

[11] 4,019,664
[45] Apr. 26, 1977

[54] WHEEL AND TIRE CARRIER FOR ATTACHMENT TO MOTOR VEHICLE DOORS

[76] Inventor: Raywood C. Weiler, 17586 Vine St., Fontana, Calif. 92335

[22] Filed: Nov. 21, 1975

[21] Appl. No.: 634,198

[52] U.S. Cl. .................... 224/42.24; 224/42.45 R; 248/285

[51] Int. Cl.² ........................................ B62D 43/02

[58] Field of Search ......... 224/42.24, 42.21, 42.06, 224/42.23, 42.2, 42.25, 29 R, 42.45 R; 248/285, 282, 289, 183, 184

[56] References Cited

UNITED STATES PATENTS

| 1,926,350 | 9/1933 | Olson | 224/42.21 |
| 2,698,118 | 12/1954 | Dickason | 224/42.21 |
| 2,827,255 | 3/1958 | Kampa | 248/285 |

OTHER PUBLICATIONS

J. C. Whitney, 1917–1919 Archer Ave., Chicago, Ill., Catalog No. 314, p. 31, Item 17, 8634.

Primary Examiner—Robert J. Spar
Assistant Examiner—Jerold M. Forsberg
Attorney, Agent, or Firm—Arnstein, Gluck, Weitzenfeld & Minow

[57] ABSTRACT

A wheel and tire carrier for attachment to a variety of different motor vehicle doors having differently arranged and spaced hinges and different width doors. The carrier has a tubular frame member which is generally U-shaped and which has curved extensions. The extensions being axially and rotatably adjustable relative to the frame member so that they may be secured to the hinges of the door with the side of the frame member secured to the side of the door adjacent the front edge of the door. The frame member supports a bracket which is pivotally supported on the frame member so that the bracket may be moved to its non-use position within the frame member for shipment and storage and moved and locked to its in-use position at right angles to the frame member.

6 Claims, 9 Drawing Figures

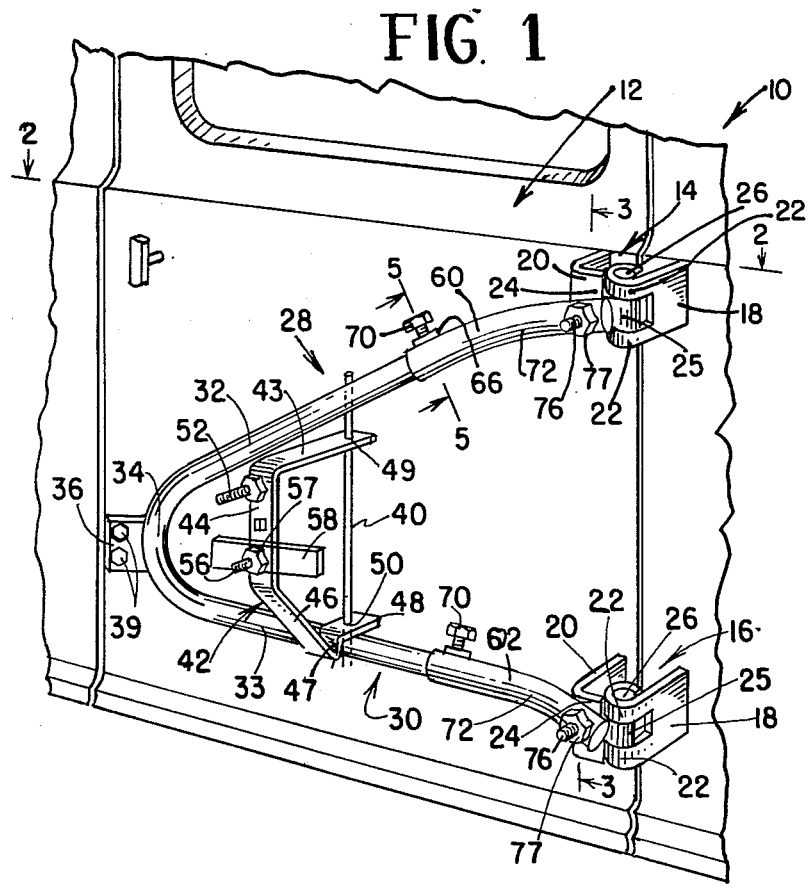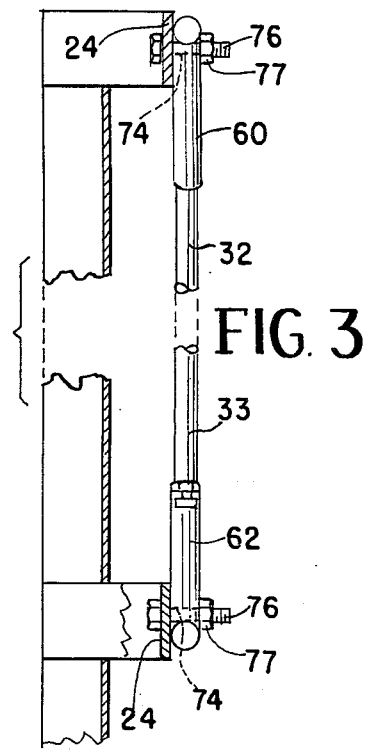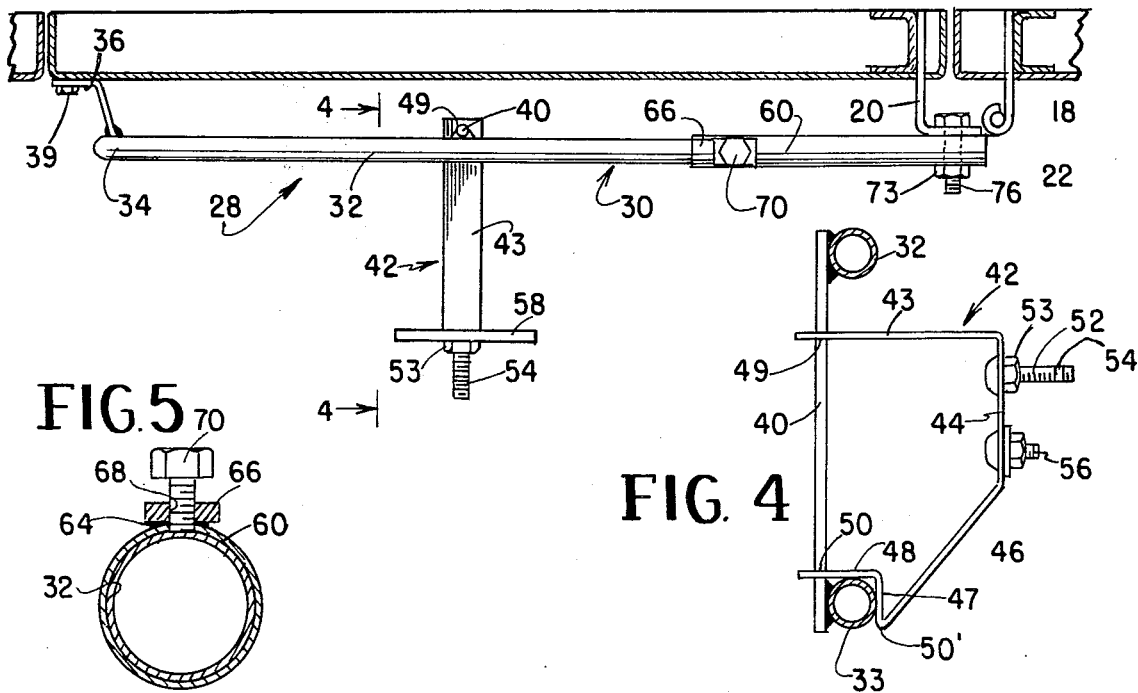

WHEEL AND TIRE CARRIER FOR ATTACHMENT TO MOTOR VEHICLE DOORS

BRIEF SUMMARY OF THE INVENTION

One of the objects of this invention is to provide a wheel and tire carrier which is readily attachable to a motor vehicle door and is particularly applicable for rear doors for vans, club wagons, sportsmen wagons, sportvans, and many motor-homes.

Another object of this invention is to provide a wheel and tire carrier comprising a frame member with a pivotally mounted bracket attached thereto, which bracket may be moved to its non-use position within the frame for purposes of shipment and the like and may be readily pivoted to its in-use position where it extends substantially at right angles to the plane of the frame for the purpose of supporting a wheel and/or tire.

Another object of the invention is to provide a wheel and tire carrier having the foregoing characteristics which has slidable and rotatable tubular ends or extensions, which ends or extensions may be axially adjusted and rotated with respect to the main frame and locked with respect to the main frame so that the entire unit is readily attachable to vehicle doors of different makes of vehicles where the hinges are spaced and arranged differently from other vehicle doors and when the doors are of different widths.

Another object of this invention is to provide a wheel and tire carrier which is attachable to a variety of different doors of different vehicles making the same unit universally applicable, thereby eliminating the need for wheel and tire carriers of different dimensions and characteristics. In other words, the invention herein makes it more universal and thereby reduces the need for a large inventory, such as where a different wheel and tire carrier is needed for each different door.

BRIEF DESCRIPTION OF THE DRAWINGS

FIG. 1 shows a view of this invention mounted on a door such as for a Dodge vehicle.

FIG. 2 is a top plan view taken on lines 2—2 of FIG. 1.

FIG. 3 is a view taken on lines 3—3 of FIG. 1.

FIG. 4 is a view taken on lines 4—4 of FIG. 2 showing the bracket in in-use locked position.

FIG. 5 is a sectional view taken on lines 5—5 of FIG. 1.

DESCRIPTION OF THE PREFERRED EMBODIMENTS

FIGS. 1-5, 8 AND 9

Figure 6:
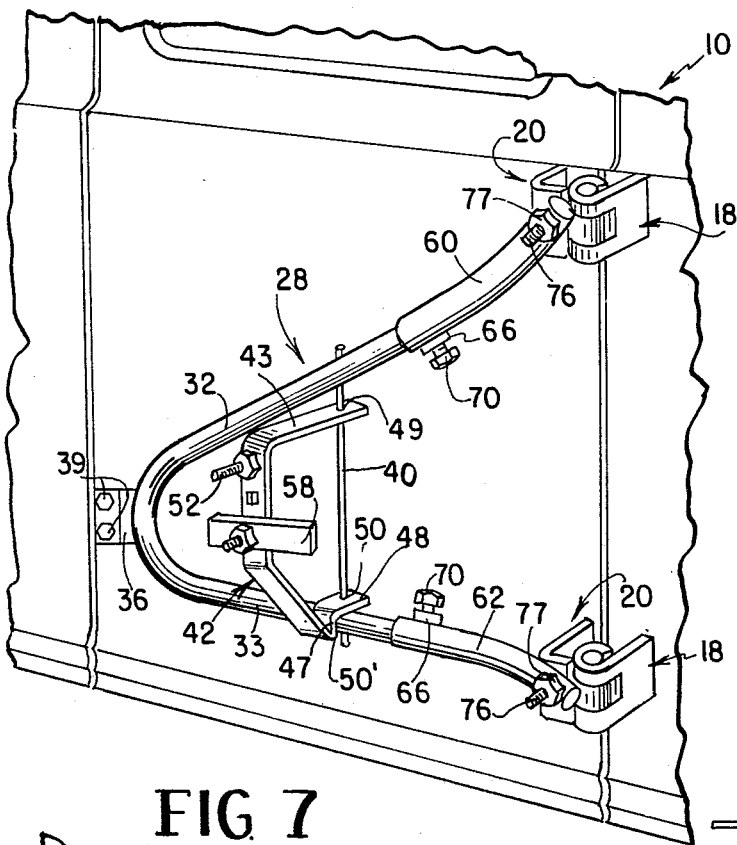
FIG. 6 is a view of the device with the tubular extensions therein turned and rotated with respect to that shown in FIG. 1 wherein same are mounted on a General Motors door.
Figure 7:
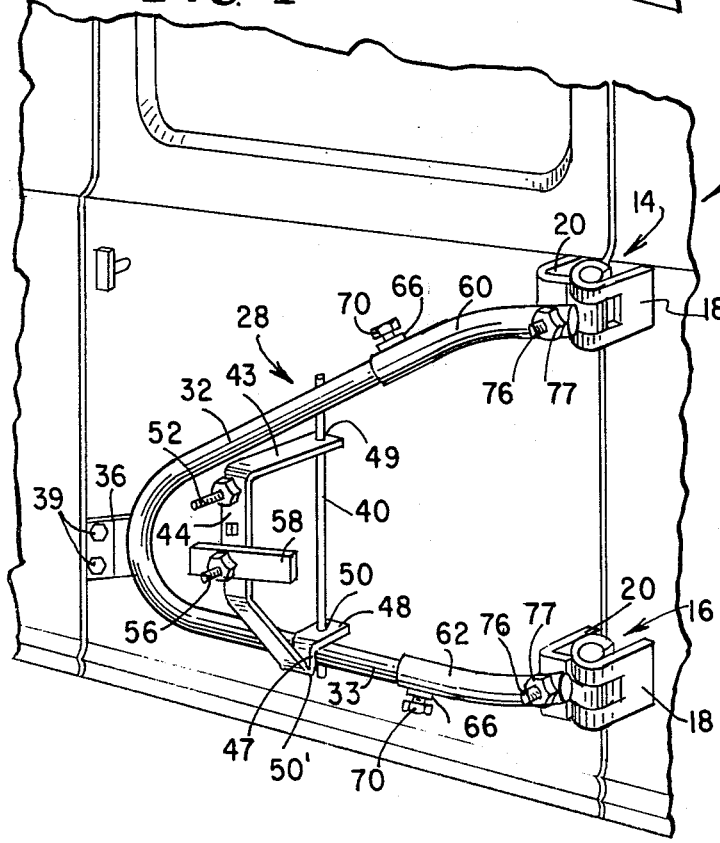
FIG. 7 is a view showing the ends or extensions turned and mounted on a Ford door.
Figure 8:
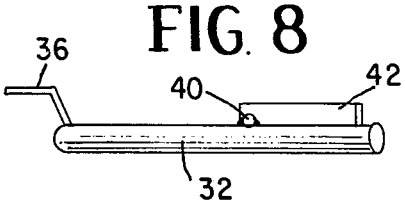
FIG. 8 is a fragmentary top view showing the front of the device.

The construction, whether in FIGS. 1–5, 8 and 9 or in FIGS. 6 and 7, is the same except that in FIGS. 6 and 7 the unit is shown in different positions from that of FIGS. 1–5.

The wheel and tire carrier unit is shown in FIGS. 1–5 mounted on the door of a Dodge vehicle. The vehicle body, generally designated at 10, has a conventional door, designated at 12. The door is hingedly supported by conventional upper and lower hinge means, generally indicated at 14 and 16, respectively. Each of said hinge means 14 and 16 is identical and will be given the same reference numerals. Each includes a pair of conventional hinge members 18 and 20 which extend outwardly of the vehicle body and the door. Hinge member 18 is secured to the vehicle body 10 and the other hinge member 20 is secured to the door 12. The hinge member 18 extends outwardly of the vehicle body and has spaced curled ears 22. The other hinge member 20 is secured to the door 12 and extends outwardly thereof and is bent at right angles to form a front end 24 which is parallel to the door. The front end 24 has a reduced curled ear 25 which fits between the spaced ears 22 of the hinge 18 and is hingedly secured thereto by a pintle 26 passing therethrough, said hinge means being conventional.

Figure 9:
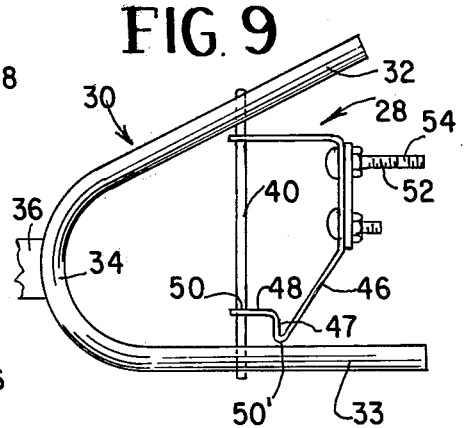
FIG. 9 is a view showing the main frame with the bracket pivoted to its non-use position where it is positioned within the arms of the main frame and within the plane of the frame.

The wheel and tire carrier forming this invention is generally indicated at 28 and comprises a tubular main frame member, generally indicated at 30, which is of a generally U- or V-shaped configuration formed from a single tubular steel stock which is shaped to form an upper arm 32 and a lower arm 33 and an intermediate curved or arcuate-shaped front end 34. Fixedly secured to the arcuate front end 34 is a metal extension 36 provided with a plurality of spaced openings 38, each opening accommodating a suitable bolt and nut 39, with each bolt passing through an opening drilled in the door adjacent the front edge of the door, whereby the carrier is attached to the side of the door adjacent the front edge of the door. Supported and anchored between the upper and lower arms 32 and 33 of the main frame 28 is a vertical rod 40 which is permanently affixed thereto as by welding the upper and lower ends of the rod as at 41 to the rear of the upper and lower arms 32 and 33 of the frame. Said rod pivotally supports a steel bracket, generally indicated at 42, which bracket has a top horizontal portion 43 and is bent downwardly at right angles thereto to form the front vertical portion 44 and then continues downwardly at an inclined angle to form the lower inclined portion 46 of the bracket which then is bent vertically upward to form a short vertical portion 47 and then bent horizontally rearward to form the lower horizontal portion 48. The portions 47 and 48 forming a step configuration which are adapted to engage the lower arm 33 to lock the bracket 42 at right angles to the frame as shown in FIGS. 1 and 4 when in in-use position. The bend between the inclined portion 46 and the vertical portion 47 being indicated at 50' and said bend is the lowermost portion of the bracket and is adapted to rest on the lower arm 33 when the bracket is pivoted to its non-use position as best shown in FIG. 9, such as when the carrier is packaged for shipment or storage or when the carrier is mounted on the door and the bracket is not positioned to support a wheel. In this non-use position of the bracket, the bracket would be confined in a vertical plane between the upper and lower arms 32 and 33 of the main frame and would not extend outwardly thereof.

The upper horizontal portion 43 of the bracket is provided with an opening 49 adjacent the rear end and the lower horizontal portion 48 has an opening 50, said openings being aligned so that the bracket 28 may be mounted on the rod 40 before the rod is permanently welded to the arms 32 and 33. The bracket 28 is rotatable or pivotally mounted with respect to the vertical rod space being provided between the upper horizontal portion 43 of the bracket and the upper arm 32 of the main frame 30 so that the bracket 42 is slidable vertically with respect to the rod 40. This permits the bracket 42 to be rotated from its non-use position, such as shown in FIG. 9 where it is positioned between the upper and lower arms of the main frame 30 and is in the same vertical plane as said arms, to a position where it is positioned as shown in FIGS. 1 and 4 in its in-use position at right angles to the plane of the main frame. When it is moved from it non-use position, such as shown in FIG. 9, the bracket 42 is rotated to a position at right angles to the main frame 30 and then allowed to slide down or drop with respect to the rod 40 so that the stepped portions 47 and 48 on the lower portion of the bracket engage the lower arm 33 of the main frame and lock therewith at right angles thereto. When the frame is mounted on the door, it will be seen that the lower arm 33 thereof is in a horizontal plane, whereas the upper arm 32 is in an inclined plane. The front vertical portion 44 of the bracket 42 has an upper square-shaped opening which receives and supports a carriage bolt 52 secured by means of a nut 53. The wheel to be supported (not shown) is secured to the carriage bolt 52. The bolt has a hole 54 to receive a small standard padlock (not shown) to lock the spare wheel and tire to the carrier. The front vertical portion 44 of the bracket has a pair of spaced lower square-shaped openings 55, the lowermost opening receives and supports a threaded bolt 56 secured thereto by a nut 57 which, in turn, supports a cross bar 58 through which the bolt extends. The wheel opening engages said bolt 56 and is secured thereto. The other opening 55 is used for securing a smaller wheel. These openings accommodate wheels of different sizes which have different size openings.

Secured to the rear or free ends of each of the arms 32 and 33 is a tubular member or extension, each of which is axially slidable on its respective arm and rotatable with respect thereto. The upper tubular member or extension being designated at 60 and the lower one at 62. Since both are identical, the same reference numbers will be applied. Each tubular extension 60 and 62 (FIG. 5) is provided with an opening 64 adjacent the inner end of the extension. Fixedly secured to said tubular extension at said opening is a plate 66 which is internally threaded as at 68. Said internally threaded portion 68 of said plate 66 being aligned with the opening 64 and adapted to receive a set screw or threaded bolt 70. The opposite end of each of the tubular extensions is bowed or curved as indicated at 72 and adjacent the opposite end there are provided a pair of diametrically spaced openings 74 which are adapted to receive an externally threaded bolt 76 and nut 77. To attach the opposite ends of said extensions 60 and 62 to the hinge, the front end 24 of each of the hinge members 20 is drilled to provide an opening, and the diametrically spaced openings 74 in the outer end of each of the tubular extensions will be aligned with said hinge opening and the bolt 76 will be passed through said opening and through the aligned openings 74 in the tubular extension and be secured thereto by the threaded nut 77 which is secured to the bolt.

As shown in FIG. 1, the tubular extensions 60 and 62 are positioned in a relationship as the same would be when the unit is attached to a Dodge vehicle, and in such position it will be seen that the upper and lower tubular extensions 60 and 62 would face in the same direction.

FIG. 6 shows the upper tubular extension 60 rotated from the position shown in FIG. 1 50 that the upper extension 60 bows upwardly and the lower extension 62 bows downwardly as in FIG. 1. This would permit attachment to a General Motors vehicle. In FIG. 6, the position of the extensions are such that they both curve outwardly with respect to the longitudinal axis of the upper and lower arms of the unit.

FIG. 7 shows the extensions positioned for attachment to a Ford vehicle in which the upper extension 60 is positioned as in FIG. 1, whereas the lower tubular extension 62 is positioned so that it curves upwardly. Thus, by virtue of the fact that the extensions 60 and 62 are axially adjustable with respect to the arms 32 and 33 of the main frame member 30 and are rotatable with respect thereto, a single unit can be used to be secured to different doors having different lengths, different heights.

After the tubular extensions 60 and 62 are adjusted and positioned relative to the arms of the frame, the set screw or bolt 70 is tightened so that it engages the arm of the frame and locks the tubular extension relative thereto against sliding movement and rotation.

In shipping the unit, the extensions 60 and 62 may be removed from the frame to reduce the overall length of the unit and the bracket 42 is turned inwardly in the position shown in FIG. 9 where it is positioned between the arms 32 and 33 of the main frame 30. To put the bracket into in-use position, the bracket is rotated on the vertical rod 40 and same will descend on said rod so that the lower stepped portion 47-48 of the bracket is positioned so that the vertical portion 47 of the bracket is forward of the lower arm 33 and the horizontal portion 48 rests on the top of the lower arm 33 as shown in FIG. 4 to lock and retain the bracket at right angles to the frame member so that the bracket may be used to support a wheel and tire. The weight of the bracket, as well as the weight of the wheel on the bracket, will tend to keep the bracket locked in its right angled position, until such time that the bracket is elevated manually on the rod 40.

The conventional wheel and tire is secured to the bolts 52 and 53 which extend through suitable openings in the conventional wheel, which wheel openings are aligned with bolts 52 and 56 so that the wheel may be placed thereon and the wheel is secured by nuts (not shown) on the ends of the threaded bolts 52 and 56. As previously stated, the bolt 52 has a hole to receive a small standard padlock (not shown) to lock the spare wheel and tire to the carrier.

What is claimed is:

1. A wheel and tire carrier for attachment to the door of a motor vehicle in which the door is hingedly supported adjacent its rear edge by upper and lower hinge means, said wheel and tire carrier comprising a frame member having upper and lower arms and a vertical rod supported between said arms, an extension attachable to each of the free rear ends of the upper and lower arms, fastening means for securing the opposite ends of the extensions to the door hinges, fastening means for securing the front end of the frame member to the door adjacent the front end of the door, a bracket slidable vertically on said vertical rod and swingably supported on said frame member intermediate the front and rear of said frame member, said bracket adapted to be manually moved from a non-use position where is it substantially positioned between the arms of the frame member to its in-use position at right angles to the frame member, said bracket having means at its lower end to engage said lower arm of said frame member when it is moved to its in-use position to retain said bracket at right angles to said frame member.

2. A wheel and tire carrier as set forth in claim 1, in which the means at the lower end of the bracket comprises a downwardly extending stepped portion which is adapted to engage the lower arm of the frame when in its right angle position with respect to said frame member to lock said bracket at right angles to said frame member.

3. A wheel and tire carrier as set forth in claim 1 in which the extensions have a curved shape and are rotatable relative to the frame member so that the outer ends of the extensions which are attached to the door hinges extend outwardly or inwardly to accommodate doors having various spaced hinges.

4. A wheel and tire carrier as set forth in claim 3 in which the extensions are also axially movable relative to said frame member.

5. A wheel and tire carrier for attachment to the door of a motor vehicle in which the door is hingedly supported adjacent its rear edge by upper and lower hinge means, said wheel and tire carrier comprising a generally U-shaped tubular frame member having upper and lower arms, a tubular extension attachable to each of the free rear ends of the upper and lower arms with the inner ends of the tubular extensions interfitting with the free rear ends of said upper and lower arms with said extensions having a curved shape and being rotatable relative to said frame member so that the outer ends of said extensions which are attached to the door hinges extends outwardly or inwardly to accommodate doors having various spaced hinges, means for locking said extensions in their rotated position, fastening means for securing the opposite ends of the extensions to the door hinges, fastening means for securing the front end of the frame member to the door adjacent the front end of the door, a bracket swingably supported on said frame member intermediate the front and rear of said frame member, said bracket adapted to be manually moved from a non-use position where it is substantially positioned between the arms of the frame member to its in-use position at right angles to the frame member.

6. A wheel and tire carrier as set forth in claim 5, in which each extension is also axially adjustable relative to the frame member.

* * * * *